(12) United States Patent  
Jodoin et al.

(10) Patent No.: US 9,359,150 B2  
(45) Date of Patent: Jun. 7, 2016

(54) SINGULATOR

(71) Applicant: AXIUM Inc., St-Laurent (CA)

(72) Inventors: Robert Jodoin, St-Lurent (CA); Sylvain Morency, St-Laurent (CA); Nicolas Durand, St-Laurent (CA); Marc Ducharme, St-Laurent (CA); Régis Métivier, St-Laurent (CA); Philippe Hakier, St-Laurent (CA); Christian Simon, St-Laurent (CA); Jean-François Forget, St-Laurent (CA)

(73) Assignee: AXIUM Inc., St-Laurent, Quebec (CA)

( * ) Notice: Subject to any disclaimer, the term of this patent is extended or adjusted under 35 U.S.C. 154(b) by 0 days.

(21) Appl. No.: 14/250,480

(22) Filed: Apr. 11, 2014

(65) Prior Publication Data

US 2014/0332344 A1 Nov. 13, 2014

Related U.S. Application Data

(60) Provisional application No. 61/811,343, filed on Apr. 12, 2013.

(51) Int. Cl.
*B65G 47/31* (2006.01)
*B65G 47/90* (2006.01)
*B65G 47/71* (2006.01)
*B65G 61/00* (2006.01)

(52) U.S. Cl.
CPC .............. *B65G 47/90* (2013.01); *B65G 47/31* (2013.01); *B65G 47/71* (2013.01); *B65G 61/00* (2013.01); *B65G 2203/0225* (2013.01); *B65G 2203/0233* (2013.01)

(58) Field of Classification Search
CPC ........ B65G 47/30; B65G 47/01; B65G 47/32; B65G 47/68; B65G 47/681; B65G 47/682; B65G 47/90; B65G 47/905; B65G 47/917; B65G 61/00
USPC ................................... 198/460.1, 461.3, 445
See application file for complete search history.

(56) References Cited

U.S. PATENT DOCUMENTS

| 4,634,328 | A | 1/1987 | Carrell |
| 5,141,097 | A | 8/1992 | Oiry et al. |
| 5,165,520 | A * | 11/1992 | Herve et al. ................ 198/460.1 |
| 5,746,572 | A * | 5/1998 | Winski ........................ 414/796.3 |
| 6,471,044 | B1 | 10/2002 | Isaacs et al. |
| 6,629,018 | B2 * | 9/2003 | Mondie et al. ................ 700/228 |
| 8,096,404 | B2 | 1/2012 | Eschlbeck et al. |
| 8,113,336 | B2 * | 2/2012 | Baumann et al. .......... 198/460.1 |
| 8,392,017 | B2 | 3/2013 | Trygg |
| 2003/0141165 | A1 * | 7/2003 | Reznik et al. ................. 198/434 |

(Continued)

*Primary Examiner* — Mark A Deuble
(74) *Attorney, Agent, or Firm* — Myers Wolin, LLC

(57) ABSTRACT

The problem of singulating products that are provided in a pallet layer is solved by breaking up the pallet layer so that each product can be handled separately by a robot tool and outputted in at least one line according to a predetermined orientation. The singulator includes a layer drop zone that receives a pallet layer of products, a break-up system that separates the products by creating gaps therebetween, yielding separated products, a vision system that determines characteristics and position of each separated product; and a robot equipped with a tool that receives information indicative of the characteristics and position of said each separated product to grip and position each separated product onto an output station within at least one line.

18 Claims, 3 Drawing Sheets

(56) References Cited

U.S. PATENT DOCUMENTS

| | | |
|---|---|---|
| 2004/0104100 A1* | 6/2004 | Schiesser et al. .......... 198/460.1 |
| 2005/0075754 A1* | 4/2005 | Zeitler et al. ................. 700/230 |
| 2007/0246328 A1* | 10/2007 | Reznik ......................... 198/444 |
| 2007/0280812 A1* | 12/2007 | Morency et al. .............. 414/729 |
| 2010/0300836 A1* | 12/2010 | Fourney et al. ............... 198/416 |
| 2010/0324729 A1* | 12/2010 | Ruge ............................ 700/245 |
| 2013/0017053 A1* | 1/2013 | Forget et al. ............... 414/796.9 |

\* cited by examiner

SINGULATOR

This application claims the benefit of U.S. Provisional Application No. 61/811,343, filed on Apr. 12, 2013, the contents of which are incorporated by reference herein.

FIELD

The present disclosure relates to depalletizing and to product conveying. More specifically, the present disclosure relates to singulation systems.

BACKGROUND

Singulation systems, also known as singulators, are known in the art of product conveying and depalletizing as systems for taking a group of products, such as a pallet layer of boxes, picking up each product, one at a time, and positioning the products one after the other.

U.S. Pat. No. 6,471,044 B1, issued on Oct. 29, 2002 to Isaacs et al. and being titled "Hold and Release Singulator" describes a singulator that includes a hold-and-release singulator module sandwiched between an infeed belt conveyor and an exit belt conveyor. The hold-and-release singulator module includes parallel independently-driven and paced conveyor belts that allows outputting parcels one at a time at the output end of the module. An optional vision system can be provided to take and process an image of the parcels to determine the two-dimensional location of the perimeter of each parcel.

A first drawback of the singulator from Isaacs et al. is that the parcels are fed pre-separated to the system and, as such, the system is not suitable to singulate a pallet layer, wherein products are closely packed.

Another drawback of the singulator from Isaacs is that there is no simple means to orient the outputted parcels.

Singulators are also well-known in the field of mail sorting. An example of a mail singulator is described in U.S. Pat. No. 4,634,328, issued to Carrell on Jan. 6, 1987 and titled "Mail Singulation System". While the singulator proposed by Carrell is configured to receive unsingulated mail in bulk, the tool and vision system used are limited to handling lightweight objects. Also, the robot tool being in the form of a pusher, orienting the mail object is again limited.

The singulator from Carrell allows highlights the fact that any efficient singulator system is configured for receiving specific objects in a predetermined configuration and to output the same objects, singulated and within an orientation determined by the singulator.

A singulator adapted to receive a pallet layer at its input and to provide at the output singulated and oriented objects from the pallet layer is thus desirable.

SUMMARY

The problem of singulating products that are provided in a pallet layer is hereby solved by breaking up the pallet layer so that each product can be handled separately by a robot tool and outputted in at least one line according to a predetermined orientation.

According to an illustrative embodiment, there is provided a singulator for receiving a pallet layer of products as input, the singulator comprising:

a layer break-up system to receive the pallet layer and for separating the products thereof, yielding separated products;

a vision system that determines at least one characteristic and a position of each separated product; and at least one robot equipped with a tool that receives information indicative of the at least one characteristic and the position of said each separated product to grip and position said each separated product onto an output station within at least one line.

According to another illustrative embodiment, there is provided a method for singulating products from a pallet layer, the method comprising:

breaking up the pallet layer, yielding separated products;

determining at least one characteristic and a position of each of the separated products; and for each of the separated products, using the at least one characteristic and the position thereof to grip and then position said each separated product within at least one output line.

According to still another embodiment, there is provided a singulator comprising a break-up station that receives and separates a pallet layer of products, yielding separated products, and a robot that uses an orientation and a position of the separated products to grip and position onto an output station in at least one line each of the separated products.

Other objects, advantages and features of the singulator and singulating method will become more apparent upon reading the following non restrictive description of preferred embodiments thereof, given by way of example only with reference to the accompanying drawings.

DETAILED DESCRIPTION

Figure 1:
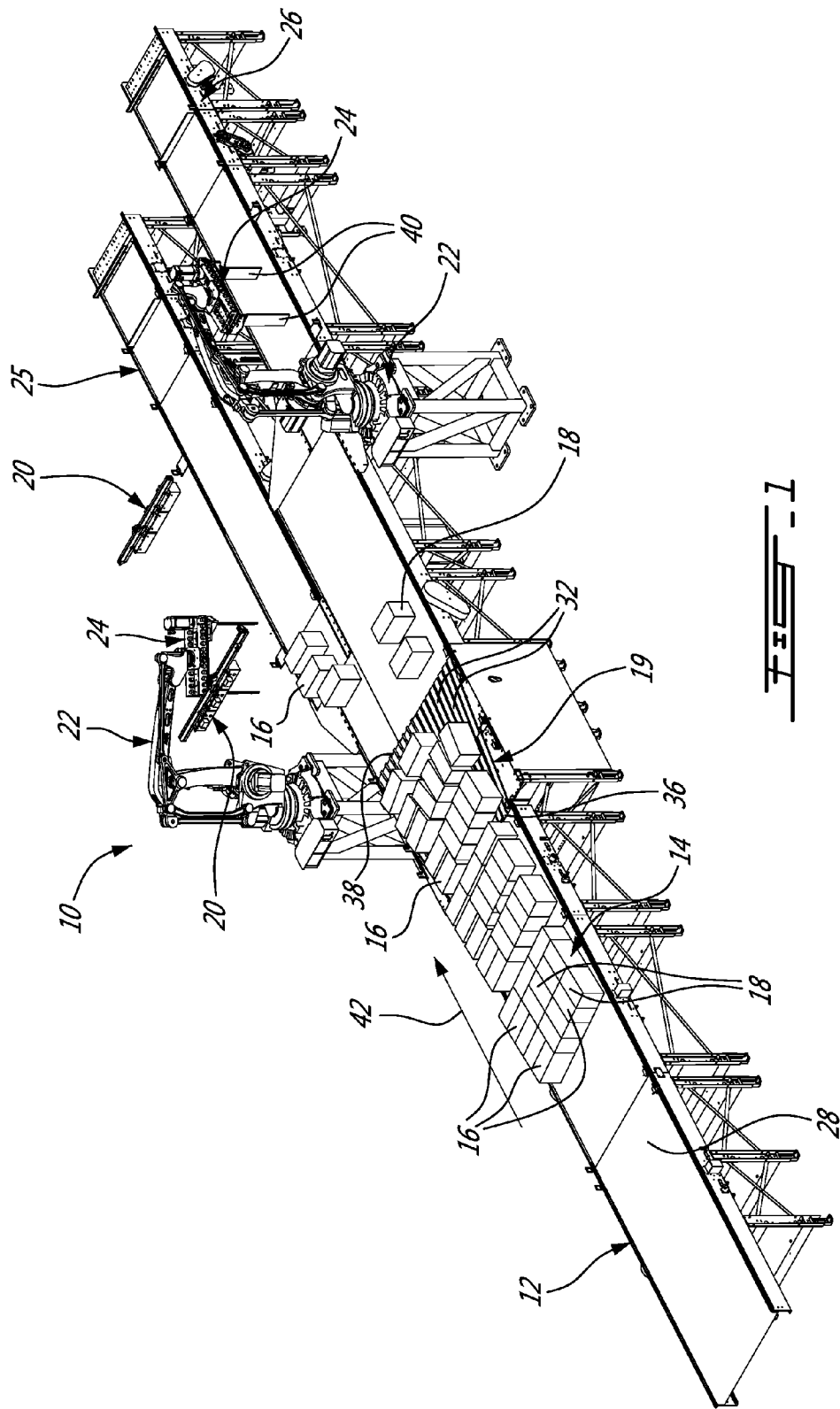
FIG. 1 is a perspective view of a first illustrative embodiment of a singulator.

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

The expression "robot" should be construed in the description and in the claims in a broad way, so as to include any device, system, apparatus or arrangement of parts that can automatically or semi-automatically operate a task onto another system, object, body or else.

A robotized singulator 10 according to a first illustrative embodiment will now be described with reference to FIGS. 1 and 2.

The singulator 10 comprises a layer drop zone 12 that receives a layer 14 of products 16-18, a layer break-up system 19 positioned downstream from the layer drop zone 12, a vision system, including two arrays of sensors 20 that locates and characterizes each of the products 16-18, two robots 22, each equipped with an end of arm tool 24, and two output stations in the form of output and reject conveyors 25 and 26, both positioned downstream from the layer break-up system 19.

The layer drop zone 12 is in the form of a motorized conveyor that is configured to receive a full pallet layer 14 of products 16-18 thereon and to transfer the pallet layer 14 to the layer drop zone 12.

The conveyor 12 can be of the roller type, of the belt type or can take any form that includes a surface 28 wide enough to receive a full pallet layer of typical size and that is motorized to transfer the full pallet layer 14 to the layer break-up zone 19.

The expressions "layer" and "pallet layer" should be construed in the description and in the claims as to include a homogeneous or inhomogeneous group of products depalletized together from an input pallet 14. Typically, there are no gaps between the products 16 and 18 in the input layer 14. A typical layer size (width×length) is 101.6 cm×121.9 cm (40"×48"). The singulator 10 and more specifically the layer drop zone 12 is however not limited to receive a layer of that size and can be adapted to receive other or variable layer sizes, for example between 81.3 cm×101.6 cm (32"×40") and 111.8 cm×132.1 (44"×52").

According to another embodiment, the conveyor 12 is not motorized and a further mechanism is used to move the layer 14 onto the conveyor 12. According to still another embodiment, the layer drop zone 12 is omitted and the layer beak up system 19 is further configured to receive the full pallet layer 14.

According to the first illustrative embodiment, the layer 14 is deposited in the layer drop zone 12 by an external system, such as a fork lift (not shown), a depalletizing robot 30 or another conveyor (not shown).

Since motorized conveyors, fork lift and depalletizing robots are believed to be well known in the art, they will not be described herein in more detail for concision purposes.

The expression "product" should be construed broadly in the description and in the claims as including any type of consumer goods in any type of packaging, such as without limitations closed cartons, tote, open top carton, shrink wrapped with or without tray, and non-shrink wrapped tray. Also, product dimensions may vary greatly between each different type of product. Typical dimensions of the products (width×length×height) can be between 10.2 cm×15.2 cm×5.1 cm (4"×6"×2") and 63.5×63.5×61 (25"×25"×24").

Two numeral references 16 and 18 are used in the description to emphasis that there can be different products in a single pallet layer 14, having same or different geometry. All products can also be identical.

The layer break-up system 19 is provided to create gaps 33 and 35 between each products 16 and 18 that are sufficient to allow the vision system 20 to detect each product independently. According to the first illustrative embodiment, the layer break-up system 19 yields gaps 33 and 25 typically between 2.5 cm (1") and 5 cm (2") between two adjacent products 16-18, yielding separated products 16-18.

The layer break-up system 19 is in the form of a multi-belt conveyor that includes a plurality of diverging motorized belts 32 that defines together a tapered conveying surface 34.

The belts 32 are independently driven so as to allow their running at different speeds so that, in operation, lateral and longitudinal gaps 34 and 35 are created and increased from the input side edge 36 of the conveyor 19 to the output side edge 38 thereof.

It is believed to be within the reach of a person skilled in the art of product conveying to dimension and operate the multi-belt conveyor 19 to yield gaps 33 and 35 between products 16 and 18 that are sufficient to be located and characterized by the vision system 20 and picked up by one of the tools 24.

Figure 2:
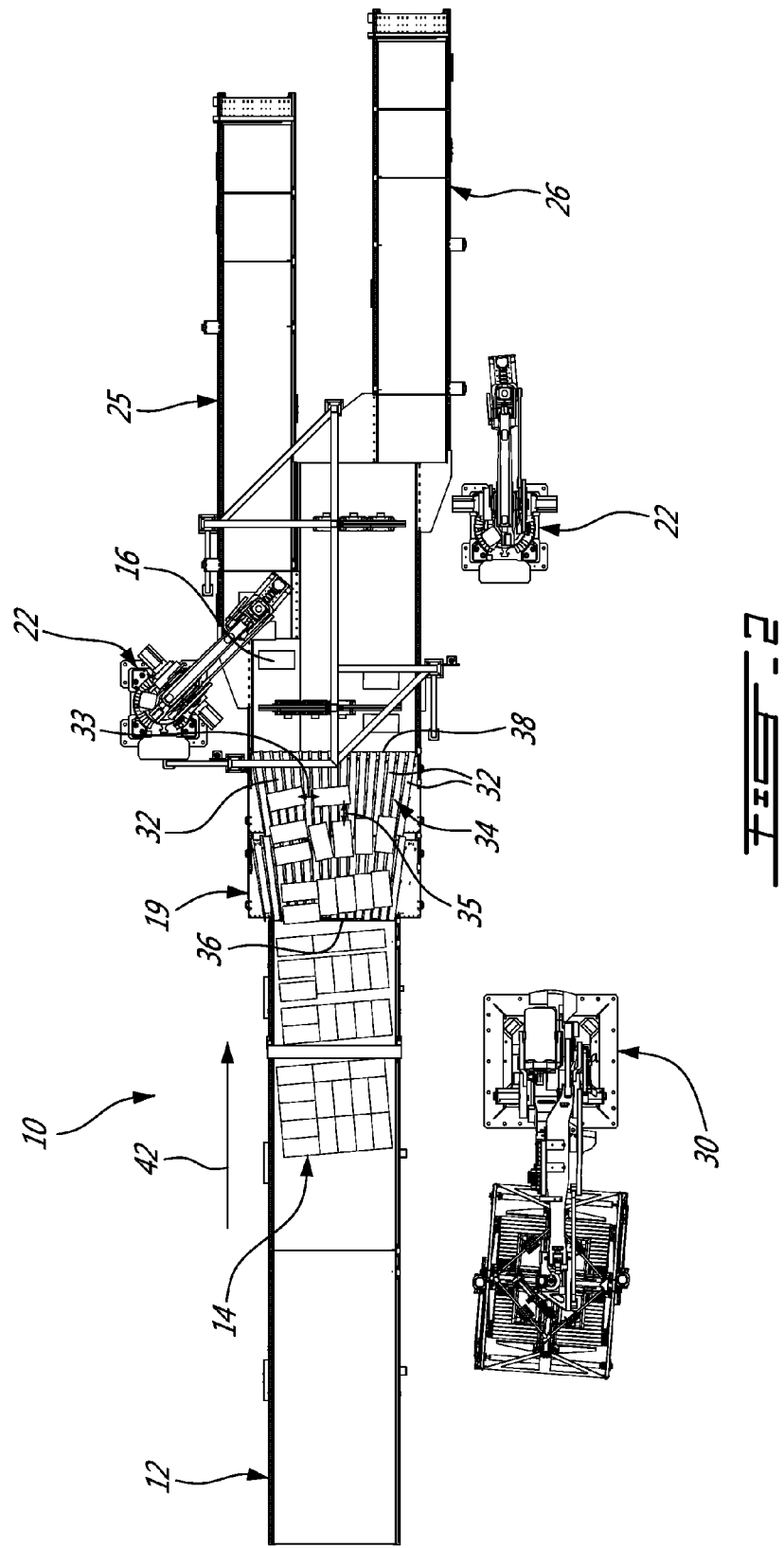
FIG. 2 is a top plan view of the singulator from FIG. 1.

The break-up system 19 is not limited to the embodiment illustrated in FIGS. 1 and 2. According to another embodiment (not shown), the break-up system includes one or a combination of independently driven skewed rollers, a multi-belt conveyor and other multi-speed conveying mechanism.

Since multi-belt and multi-speed conveyors are believed to be well known in the art, they will not be described herein in more detail for concision purposes.

The two arrays of sensors 20 (two shown in FIG. 1) are secured to the ceiling (not shown) above the output end of the layer break-up system 19 and is positioned and configured to acquire an image of the layer located in the break-up system 19. According to the first illustrated embodiment, each array 20 includes 3 sensors.

Examples of suitable sensors include typical industrial cameras or the Kinect Device™ from Microsoft™. According to another embodiment, the sensors are in the form of two-dimensional color cameras. According to still another embodiment, the vision sensor includes one or more lasers and one or more two-dimensional cameras that yield a triangulation setup that allows three-dimensional reconstructions of the scene as the conveyor moves.

According to the first illustrated embodiment, the image acquired by the vision system is a depth map allowing three-dimensional view of the layer within the layer break-up system 19. According to another embodiment, the image is two-dimensional. The image can be monochrome or in colors.

The vision system includes a computer (not shown) that is programmed for analyzing the sensor data, to detect and validate product characteristics, locate each product 16 and 18 and calculate product coordinates an orientation in a reference system that is known to the robots 22.

Examples of product characteristics detected and/or validated by the vision system includes without restrictions the dimension and shape of the product 16 or 18, separation between adjacent products, optimal exit vector for the product 16 or 18, colors, writings, logos, signs and other printings, engravings, etc. thereon that can be seen from a top and/or perspective view of the product.

The validation of the product 16 or 18 may include comparing the 3D model thereof to a model of the product as it should look like so as to detect any defect thereon. Predetermined criteria stored for example on the computer or accessible therefrom can be used to trigger the detection of a damaged product.

According to another embodiment (not shown), the array of sensors 20 includes more or less than three sensors. The number of array may also be different than two (2). Also, the array of sensors 20 may also be secured to a wall adjacent the break-up system 19 or to a frame element or gantry (both not shown) that positions the array of sensors 20 so as to yield a field of view that includes the break-up system 19 or at least a portion thereof.

According to a more specific embodiment, the vision system is configured to see the conveyor surface 34 through the gaps between the products. According to this specific embodiment, the light reflecting properties of the conveyor are determined in advanced. Considering that products 16-18 come in a large variety and that some of these products 16-18 may have reflecting properties that are not well suited for the vision sensors selected 20, recognizing the conveyor surface 34 through the gaps between the products 16-18 allows in such occurrences to better the identification and/or characterization of the products 16-18 by the vision system.

Since vision systems and vision sensors are believed to be well known in the art, they will not be described herein in more detail for concision purposes.

The robots 22 are in the form of conventional industrial robots, each equipped with an end of arm tool 24 adapted for handling all products 16-18 targeted by the singulator 10. The robots 22 used information indicative of the characteristics and position of each separated product 16-18 to grip and position each so separated product 16 or 18 onto a selected one of the output and reject conveyors 25 and 26. For examples, information related to a product 16 or 18 that has been found to be damaged by the vision system is sent to the robot 22 which is nearer the reject conveyor 26. This robot 22 can then pick up the damaged product and move it from the break-up system 19 to the damaged conveyor 26.

The gaps 33 and 35 created between the products 16-18 by the break-up system 19 allow anyone of the two robots 22 to grab the products 16-18 with their end of arm tool 24.

According to the first illustrated embodiment, the end of arm tool 24 includes adjustable vertical side plates 40 together that define a clamp. The plates 40 are movable towards and away one another.

According to another embodiment (not shown), the end of arm tool is a vacuum gripper. Since clamp-type and vacuum-type grippers are believed to be well known in the art, they will not be described herein in more detail for concision purposes.

In operation of the robots 22, one of the two robots is sent the information indicative of the characteristics and position of a product 16 or 18 selected to be picked up from the break-up system 19. The tool 24 opens sufficiently to be positioned over the selected product and so as to have its side plates positioned on respective opposite sides thereof. The plates 40 are then moved until they contact the selected product 16 or 18 and the robot 22 moved the tool 24 with the selected product on the corresponding one of the output and reject conveyors 25 or 26.

It is to be noted that a force is applied by the tool 24 between the two plates 40 which is sufficient to hold the product while it is raised but not too strong as to damaged or deformed the selected product. The required force is determined by the robot controller (not shown) using the information indicative of the selected product characteristics.

While the first illustrative embodiment includes two (2) robots, a singulator according to another embodiment may include one or more than two (2) robots depending on the application, desired cadency and/or product-type.

The output of the singulator 10 is a flow products 16-18 positioned on the output conveyor 25 in a desired orientation or in groups according to specific patterns. Examples of such patterns include groups of products 16-18 that are assembled according to a pre-defined arrangement, including specific orientations. Such arranged products are said to be singulated. A typical group size is between one (1) and five (5) products 16-18.

The expression "singulated" is not intended to be construed herein in any way and should be construed to include any product that has been separated from a pallet layer and moved individually to a selected area.

According to the first illustrated embodiment, products 16-18 that are determined by the vision system to be damaged or more generally that do not have predetermined characteristics are picked up and moved to the reject conveyor 26 by the nearest robot 22.

According to another embodiment (not shown), both robots 22 are operated so as to move undamaged and damaged products from the break-up system 19 to the corresponding conveyor 25 or 26 respectively.

According to still another embodiment (not shown), the products 16-18 are selected to be dropped on either one of the two conveyors 25-26 based on other criteria than being damaged or undamaged.

According to a further embodiment, the second output conveyor 26 is omitted and all products 16-18 are positioned onto a same output conveyor 25.

The output and reject conveyors 25 and 26 are in the form of linear conveyors adapted for receiving singulated products. Anyone or both of the conveyors 25-26 can be of the roller type or of the belt type and can be motorized or not.

Figure 3:
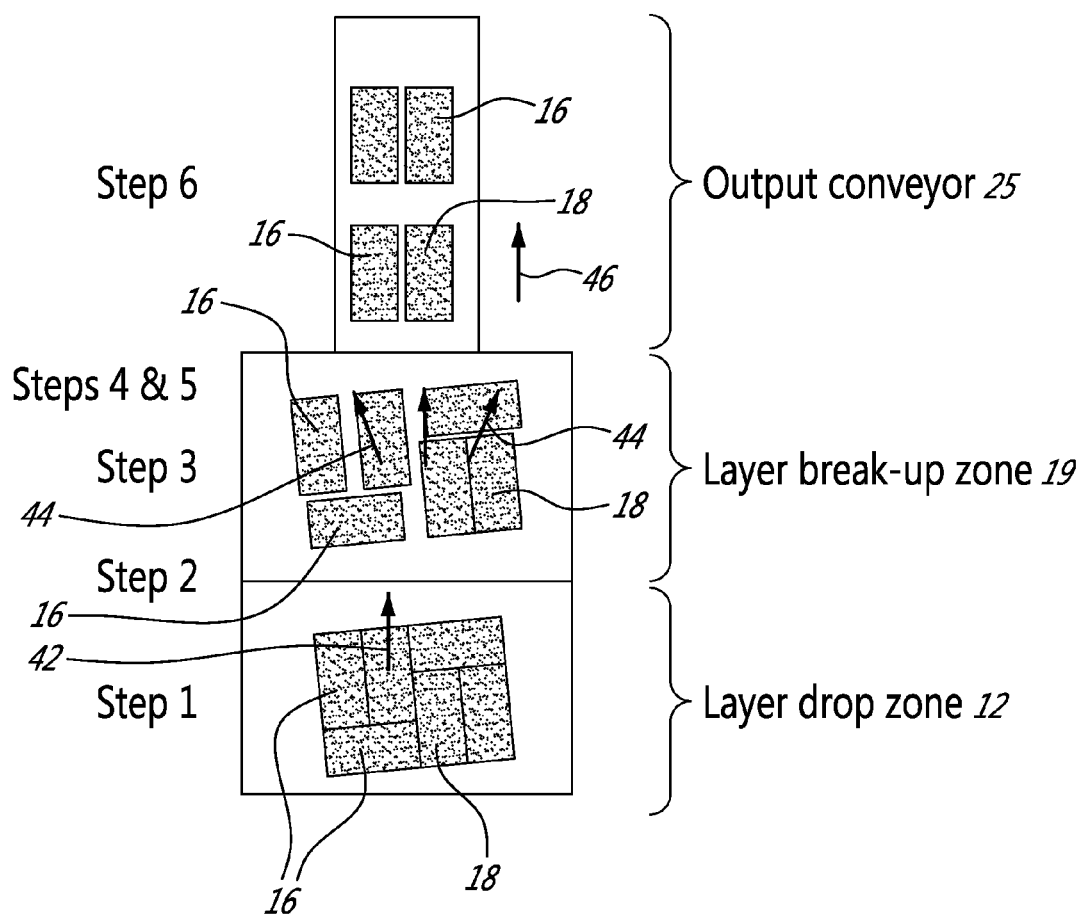
FIG. 3 is a top plan schematic view illustrating an illustrative embodiment of a method for singulating products from a pallet layer.

A method for singulating products 16-18 from a pallet layer 14 will now be described with reference to FIG. 3.

A complete layer 14 of product 16-18 is first provided, for example on the layer drop zone 12, by an external system such as for example a layer handling robot (step 1). The layer 14 may be dropped slightly skewed to facilitate product separation later in the process.

In step 2, the layer 14 is then transferred from the drop zone 12 to a layer break-up zone or system 19 (see arrow 42).

In step 3, the layer 14 is broke-up, resulting in the products 16 and 18 from the layer 14 being separated or distanced from one another (see arrow 44).

More specifically, the break-up zone 19 creates gaps 33 and 35 between each product as the layer 14 is transferred (step 3). The gaps 33 and 35 created are such as to allow a vision system to locate each product 16-18 without ambiguity and for a tool 24 to pick up each product individually.

Using a vision system, each product 16-18 are located using coordinates in a reference system that is known to the robot(s) (step 4). The vision system also detects product characteristics and identifies products that are invalid and should be rejected.

The robots 22 uses the coordinates obtained from the vision system to grip the products and slide them on the conveyor surface to realign and reposition them in the correct position and orientation on the output conveyor 25 (step 5). Products that have been declared invalid are sent to the reject conveyor 26 instead.

The output conveyor 25 feeds a file of singulated products, or groups of products, to an external system (step 6) (see arrow 46).

It is to be noted that modifications could be made to the singulator and singulating method described hereinabove and illustrated in the appended drawings. For example:

- in order to facilitate layer break-up, the input layer 14 can be deposited on the layer drop zone 12 in a certain orientation. Communication with the external equipment handling the layer 14 may be necessary to request the appropriate drop angle;
- the layer break-up system 19 can be a combination of conveyors running at various speeds and/or independently driven skewed roller sections or belts. Typically, gaps of 2.5 cm (1") to 5 cm (2") in both the X-axis (direction of travel) and the Y-axis (perpendicular to the direction of travel) are created by the system 19. According to another embodiment (not shown), the layer break-up system 19 creates a gap between the products 16-18 only along the X or Y axis. The vision system and robot tool 24 are configured accordingly;

the sensors 20 of the vision system are positioned vertically above the layer break-up zone. Additional sensors may be placed at an angle to provide a different perspective. The total number of sensors is adapted to the final configuration;

the vision system can be further configured or programmed as an inspection system to further monitor and/or validate product characteristics;

the number of robots 22 and their position on the layout are adapted to the application. The robots 22 can be standard 4-axis industrial robots. A 6-axis robot or a gantry type robot can also be used;

the singulator 10 can include one or more output conveyors that are positioned and configured so as to have a direction of travel and speed that are not necessarily the same as that of the drop and break-up zone conveyors 12 and 19;

the input of the singulator can be in the form of products deposited manually in any position and orientation on the drop zone;

the singulator can include a slip sheet removal system (not shown) to remove a slip sheet on the layer 14 when such a sheet is present. Since slip sheet removal systems are believed to be well-known in the art, they will not be described herein in more detail for concision purposes; and the robots 22 can be operated so as to yield an output of the singulator 10 as being groups of products stacked over each other instead of being side by side.

It is to be understood that embodiments of the singulator and singulating method are not limited in their application to the details of construction and parts illustrated in the accompanying drawings and described hereinabove. Other embodiments can be foreseen and practiced in various ways. It is also to be understood that the phraseology or terminology used herein is for the purpose of description and not limitation. Hence, although the singulator and singulating method have been described hereinabove by way of illustrative embodiments thereof, it can be modified, without departing from the spirit, scope and nature of the subject invention.

What is claimed is:

1. A singulator comprising:
    a layer break-up system for receiving a pallet layer of products and for creating gaps between each of the products so as to yield longitudinally and laterally separated products;
    a vision system that determines at least one characteristic and a position of each separated product, the gaps sufficient to allow the vision system to detect each of the products independently; and
    at least one robot that receives information indicative of the at least one characteristic and the position of said each separated product to grip and position said each separated product onto an output station within at least one line.

2. A singulator as recited in claim 1, wherein the break-up system includes a multi-belt conveyor.

3. A singulator as recited in claim 1, wherein the output station includes an output conveyor.

4. A singulator as recited in claim 3, wherein the output station further includes a reject conveyor to receive invalid products that have been identified among the separated products by the vision system as being damaged or defective.

5. A singulator as recited in claim 1, further comprising a layer drop zone that receives the pallet layer of products and that transfers the pallet layer to the layer break-up system.

6. A singulator as recited in claim 5, wherein the layer drop zone includes a conveyor.

7. A singulator as recited in claim 1, wherein the vision system includes at least one sensor.

8. A singulator as recited in claim 7, wherein the vision system includes a computer programmed to analyse data received from the at least one sensor.

9. A singulator as recited in claim 8, wherein the computer is further programmed for detecting and validating the separated products.

10. A singulator as recited in claim 9, wherein said validating the separated products includes creating a three-dimensional model of each of the separated products.

11. A singulator as recited in claim 1, wherein the vision system is further configured for inspection of at least some of the separated products.

12. A singulator as recited in claim 1, wherein the at least one robot is equipped with an end of arm tool that includes adjustable side plates that define a clamp.

13. A singulator as recited in claim 1, wherein the at least one robot includes two robots.

14. A singulator as recited in claim 1, wherein the at least one characteristic of each separated product is selected from the group consisting of: a dimension thereof, a shape thereof, an orientation thereof, a distance between said each separated product and at least one product adjacent said each separated product, optimal exit vector for said each separated product, a color thereof, writing thereon, printing thereon, and engravings thereon.

15. A method for singulating products from a pallet layer, the method comprising:
    breaking up the pallet layer by creating gaps between each of the products so as to yield longitudinally and laterally separated products;
    determining at least one characteristic and a position of each of the separated products; and
    for each of the separated products, using information indicative of the at least one characteristic and the position thereof to grip and then position said each separated product within at least one output line.

16. A method as recited in claim 15, wherein the at least one characteristic of each of the separated products includes an orientation thereof.

17. A method as recited in claim 15, wherein determining at least one characteristic and position of each of the separated products include constructing a three dimensional model of said each separated product.

18. A singulator comprising a break-up station that receives a pallet layer of products and that creates gaps between each two products that are adjacent, yielding laterally and longitudinally separated products, and a robot that uses information indicative of orientation and position of the separated products to grip and position each of the separated products onto an output station in at least one line.

* * * * *